United States Patent [19]

Kunze et al.

[11] Patent Number: 4,648,420

[45] Date of Patent: Mar. 10, 1987

[54] FLUID CONTROL VALVE

[75] Inventors: Lothar Kunze, Hofheim-Langenhain; Rolf Greeb, Kriftel; Ralf Bender, Hofheim, all of Fed. Rep. of Germany

[73] Assignee: Alfred Teves GmbH, Frankfurt, Fed. Rep. of Germany

[21] Appl. No.: 733,716

[22] Filed: May 13, 1985

[30] Foreign Application Priority Data

May 11, 1984 [DE] Fed. Rep. of Germany ....... 3417458

[51] Int. Cl.⁴ .............................................. F16K 23/00
[52] U.S. Cl. ................................ 137/312; 137/505.18
[58] Field of Search ........................... 137/505.18, 312

[56] References Cited

U.S. PATENT DOCUMENTS

| 219,114 | 9/1879 | Ross | 137/505.18 |
| 404,504 | 6/1889 | Ross | 137/505.18 |
| 746,755 | 12/1903 | Spencer | 137/505.18 |
| 1,294,151 | 2/1919 | Page | 137/505.18 X |
| 1,772,406 | 8/1930 | Whiton | 137/505.18 |
| 2,805,680 | 9/1957 | Longbottom | 137/505.18 X |
| 2,808,068 | 10/1957 | Thomas | 137/505.18 X |
| 2,825,358 | 3/1958 | Niles | 137/505.18 |

Primary Examiner—Harold W. Weakley
Attorney, Agent, or Firm—James B. Raden; William J. Michals

[57] ABSTRACT

A control valve with a control slider (9) comprising bead-type areas (17, 18, 19), by means of which the control slider is slidably arranged in the cylinder bore (8). The areas (17) and (18) isolate the inlet (2) from the outlet (3), while the area (19) isolates the outlet (3) from the leakage oil port (4). The clearance between the areas (17) and (18) of the control slider (9) and the wall of the cylinder bore (8) is smaller than the clearance between the area (19) of the control slider (9) and the wall of the cylinder bore (8). The output pressure is kept within close tolerances with only minor leakage losses.

1 Claim, 1 Drawing Figure

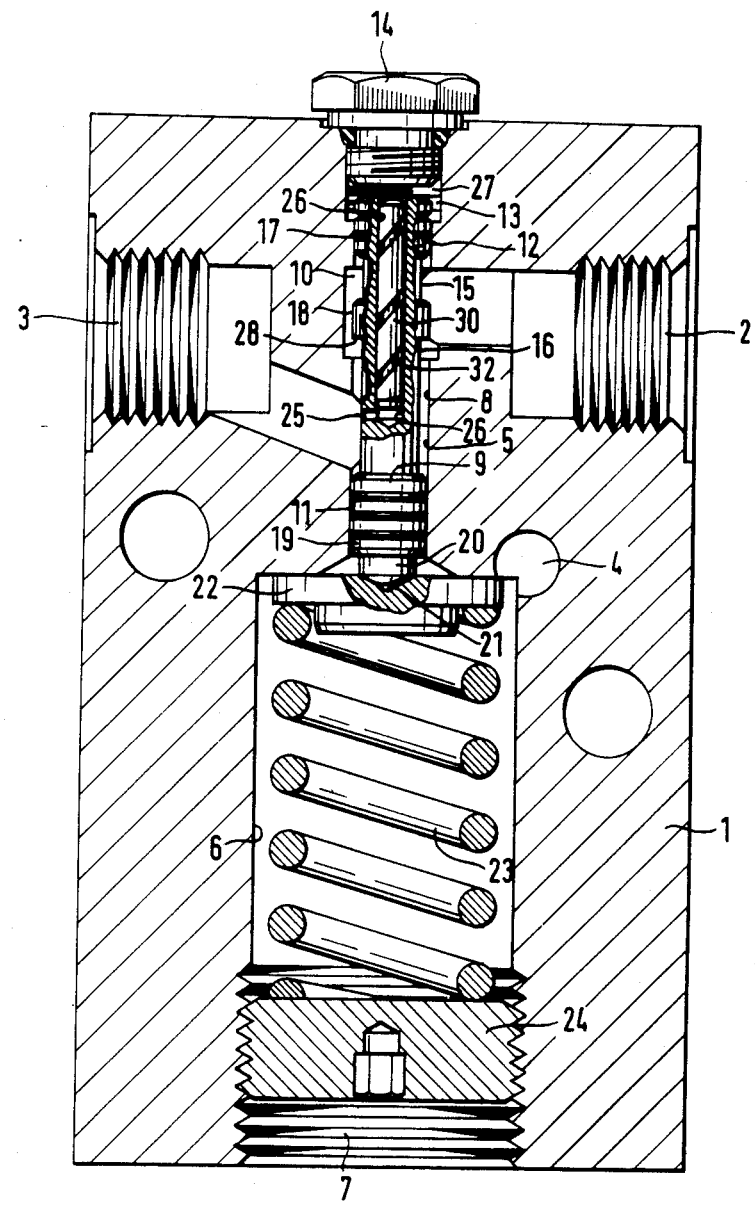

FLUID CONTROL VALVE

BACKGROUND OF THE INVENTION

The present invention relates to a fluid control valve comprising a control slider that is arranged in a cylinder bore between a pressure fluid inlet and a pressure fluid outlet and that is displaceable in opposition to the force of a preloading device from an opened position, in which inlet and outlet are interconnected, into a closing position in which it isolates the inlet from the outlet, by virtue of exerting the output pressure on an end surface of the control slider confining a fluid chamber. The housing accommodates the serial connection of the fluid chamber, a first portion of the cylinder bore, an annular extension of the cylinder bore terminating into which is the inlet, a second portion of the cylinder bore terminating into which is the outlet, and a bore receiving the preloading device into which a leakage oil port terminates. The control slider includes at least one recess which is isolated from the end surfaces by way of first and second areas conformed to the cylinder bore, and which recess is allocated to the outlet in the closing position.

Fluid control valves are actuated in response to at least one varying fluid pressure in order to control the fluid pressure and/or the fluid flow in a connected system. Normally such pressure functions to displace a control piston, designed for example as control slider, which changes the opening cross-sections of fluid ports. In a pressure-reducing valve, for example, there is provided a spring assembly which acts on the control slider in opposition to the force caused by the output pressure. The control slider in a pressure-reducing valve is movable by the output pressure into the closing position in opposition to the force of the spring assembly.

In German printed and published patent application No. 32 22 860, a fluid control valve is disclosed in which the control slider includes areas of like diameter conformed to the diameter of the cylinder bore. One of the areas isolates the inlet from the outlet in the closing position, while another one thereof isolates the outlet from a portion of the cylinder bore communicating with a leakage oil port. The portions of the cylinder bore which cooperate with the areas of the control slider are of like diameter. The quantity of leakage oil passing through between inlet and outlet may result in an increase of the output pressure. Therefore, a quantity of leakage oil is allowed to flow off to the leakage oil port. However, maintaining a predetermined output pressure tolerance necessitates a nigh quantity of leakage oil flowing off to the leakage oil port. This is a problem.

It is an object of the present invention to provide a fluid control valve of the type referred to which ensures that the output pressure is maintained exactly while only small leakage oil losses occur.

SUMMARY OF THE INVENTION

This object is achieved according to the present invention in that there is provided a flow cross-section, between the first area of the control slider adjacent to the preloading device and the cylinder bore, from the outlet to the leakage oil port for the pressure fluid which is larger than the flow cross-section provided between the inlet-side second area of the control slider and the cylinder bore. As a result, the quantity of leakage oil propagating from the inlet to the outlet is less than, or at most equal to, the quantity of leakage oil flowing off to the leakage oil port. An improvement which is particularly suitable for manufacture provides for the flow cross-section to be formed by the annular gap that is due to the existing clearance of motion of the control slider in the cylinder bore.

An embodiment of this invention which is particularly advantageous with respect to exact manufacture of the external diameter of the control slider comprises a control slider provided with a second recess which is assigned to the inlet in the closing position and which subdivides the second area of the control slider, and in that the areas located on either side of the inlet between the said and the fluid chamber or, respectively, the outlet, are arranged in the cylinder bore with less clearance than the first area between outlet and leakage oil port.

The portions of the cylinder bore may be provided of like diameter and that the first area of the control slider is of smaller diameter than the second area. Likewise the areas of the control slider may be provided of like diameter and that the portion of the cylinder bore allocated to the first area of the control slider is of larger diameter than the portion of the cylinder bore allocated to the second area. A further improvement provides that the pressure fluid line interconnecting the fluid chamber and the outlet extends in the control slider and is furnished with a throttling device.

BRIEF DESCRIPTION OF THE DRAWING

An embodiment of the present invention will be described in more detail hereinbelow with reference to the accompanying drawing in which the single FIGURE illustrates a fluid control valve in accordance with the principles of the present invention.

DETAILED DESCRIPTION

The pressure-reducing valve comprises a housing 1 with a first inlet 2 connected to the pressure source and a second outlet 3 leading to a user component. Further, there is provision of a port 4 for the return of leakage oil.

The ports 2, 3, 4 terminate into a bore 5 that is stepped several times and located centrically in the housing 1. At the lower end of the housing 1, when viewing in the drawing, there is formed a bore portion 6 of larger diameter including at its end an internally threaded portion 7. Said bore portion 6 extends over about half of the axial length of the housing 1.

Succeeding this bore portion 6 is a cylinder bore 8 in which the control slider 9 is slidably accommodated. Said cylinder bore 8 comprises an annular extension 10 subdividing the cylinder bore 8 into two portions 11, 12. Terminating into the lower portion 11, when viewing in the drawing, is the outlet 3 leading to the user component, while the inlet 2 terminates into the annular extension 10.

At the upper end of the upper portion 12, the cylinder bore 8 is provided with an internally threaded portion 13, into which a screw plug 14 is threadedly advanced which sealingly closes the cylinder bore 8. In lieu thereof, likewise a closure plug which can be secured without thread maybe used. The control slider 9 comprises two annular recesses 15, 16 of like diameter, by which three areas 17, 18, 19 of specific axial length and of specific external diameter are defined. Upper area 17 and lower area 19 are slidably located in part of the upper portion 12 and the lower portion 11 of the cylinder bore 8, respectively. The intermediate area 18 is disposed in the annular extension 10.

The lower annular edge of the intermediate area 18 of the control slider 9 forms the control edge 28 and coacts with the assigned housing edge at the transition of the annular extension 10 into the lower portion 11 of the cylinder bore 8. To improve control behaviour, the control edge 28 may be furnished with a chamfer. When the cross-section of openings is small, the damping of oscillations will be improved thereby.

At its lower end, the control slider 9 comprises a peg-shaped projection 20 abutting on an indentation 21 of a spring retainer 22. Acting upon said spring retainer 22 is the pressure of a compression spring 23 which exerts a force displacing the control slider 9 in the direction of the screw plug 14. Said compression spring 23 and the spring retainer 22 as well as the port 4 for the leakage oil return are placed in the larger-diameter bore portion 6 of the stepped bore 5. Arranged in the internally threaded portion 7 of the bore portion 6 is a setscrew 24 which serves to adjust the spring tension of the compression spring 23 bearing thereagainst.

The control slider 9 has extending in its interior a recess with a radial inner bore portion 25 and an axial inner bore portion 26. The radial inner bore portion 25 terminates at the outer periphery of the lower annular recess 16 of the control slider 9 and is thus in communication with the outlet 3 leading to the user component. The axial inner bore portion 26 terminates at the upper frontal end of the control slider 9 into a pressure chamber 27 which is axially confined by the control slider 9 and the screw plug 14.

A damping element 30 with at least one spiral-like groove 32 at its outer periphery is pressed into the axial inner bore portion 26. Said groove 32 forms together with the inner wall of the axial inner bore portion 26 a throttle channel for damping the movement of the control slider 9.

The pressure-reducing valve is opened in its inactive position so that inlet 2 and outlet 3 are in communication with one another. When pressure develops at the inlet 2, the control slider 9 will be displaced downwards by the pressure developing in the pressure chamber 27 in opposition to the force of the compression spring 23 and its control edge 28 will close to such an extent that only that amount of fluid is permitted to flow to the outlet 3 which will be received by the user component without causing pressure increase on the outlet side.

As the control slider 9 is accommodated in the cylinder bore 8 with clearance of motion, there is little leakage loss between control slider 9 and bore wall. The clearance between the upper area 17 and the intermediate area 18 of the control slider 9 and the associated portions 11 and 12 of the cylinder bore 8 is chosen to be smaller than the clearance between the lower area 19 of the control slider 9 and the associated cylinder bore portion 11.

Accordingly, the quantity of leakage oil which penetrates from the annular extension 10 (i.e., from the inlet 2) by way of the annular gap between intermediate area 18 of the control slider and the wall of the cylinder bore portion 11 to the outlet, and by way of the annular gap between the upper area 17 of the control slider and the wall of the cylinder bore portion 12, to the outlet (which leakage oil quantity would result in an increase of the out-put pressure when the user component is disconnected) passes through the annular gap between the lower area 19 of the control slider 9 and the lower portion 11 of the cylinder bore 8 to the leakage oil port 4. Thus, an undesired rise of the pressure on the outlet side is avoided, while only a small amount of leakage oil is allowed to flow.

What is claimed is:

1. A fluid control valve comprising, in combination:
a valve housing having an inlet opening and an outlet opening;
a cylinder bore in said housing extending generally traversely to the direction of fluid flow through said housing, said bore having a first portion communicating with said inlet opening and a second portion axially spaced from said first portion and communicating with said outlet opening; said cylinder bore having an enlarged annular extension axially intermediate of and of a greater diameter than said first and second portions;
a control slider slidably disposed in said cylinder bore, said slider having an axially central recess portion separating first and second end portions of said slider the diameters of which are substantially equal to the diameter of said cylinder bore, said recess portion communicating with said outlet opening when said control valve is in its closed position;
a stepped bore in said housing coaxially extending away from one end of said cylinder bore, said stepped bore having a diameter significantly greater than the diameter of said cylinder bore;
a leakage oil port in said housing communicating with said stepped bore;
means in said stepped bore for engaging and resiliently urging said control slider toward the other end of said cylinder bore;
a pressure chamber in said housing at the other end of said cylinder bore communicating with said outlet opening;
wherein pressure developed in said pressure chamber translates said slider toward said one end of said cylinder bore until said first portion of said slider is located adjacent said second portion of said cylinder bore to restrict the flow of fluid between said inlet and outlet openings; and
wherein the diameter of said second portion of said slider is significantly less than the diameter of said first portion of said slider whereby leakage oil flowing through said annular extension passes to said leakage oil port through the annular gap between said second portion of said slider and the wall of said second portion of said cylinder bore.

* * * * *